United States Patent
Braunbeck et al.

(10) Patent No.: US 11,990,813 B2
(45) Date of Patent: May 21, 2024

(54) STATOR FOR AN ELECTRICAL MACHINE AND ELECTRICAL MACHINE

(71) Applicant: Dr. Ing. h.c. F. Porsche Aktiengesellschaft, Stuttgart (DE)

(72) Inventors: Florian Braunbeck, Leinfelden-Echterdingen (DE); Tobias Schmack, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 58 days.

(21) Appl. No.: 17/829,559

(22) Filed: Jun. 1, 2022

(65) Prior Publication Data

US 2022/0407379 A1 Dec. 22, 2022

(30) Foreign Application Priority Data

Jun. 21, 2021 (DE) .................... 10 2021 115 932.6

(51) Int. Cl.
*H02K 3/34* (2006.01)
*H02K 3/30* (2006.01)
*B60K 1/00* (2006.01)

(52) U.S. Cl.
CPC .............. *H02K 3/345* (2013.01); *H02K 3/30* (2013.01); *B60K 1/00* (2013.01)

(58) Field of Classification Search
CPC ... B60K 1/00; H02K 3/30; H02K 3/34; H02K 3/345
USPC ........................................ 310/215
See application file for complete search history.

(56) References Cited

U.S. PATENT DOCUMENTS

| | | | |
|---|---|---|---|
| 5,721,397 A | 2/1998 | Weinberg | |
| 8,212,449 B2 | 7/2012 | Kouda | |
| 9,130,430 B2 | 9/2015 | Chamberlin et al. | |
| 2005/0012424 A1 | 1/2005 | Irwin et al. | |
| 2011/0095641 A1 | 4/2011 | Rhoads | |
| 2019/0109513 A1* | 4/2019 | Bethge | H02K 9/197 |
| 2020/0136445 A1* | 4/2020 | Hoerz | H02K 9/227 |
| 2020/0156296 A1* | 5/2020 | E Silva | H02K 15/10 |
| 2020/0161917 A1* | 5/2020 | E Silva | H02K 9/197 |
| 2020/0161918 A1* | 5/2020 | Almeida E Silva | H02K 1/165 |
| 2020/0161947 A1* | 5/2020 | Almeida E Silva | H02K 15/105 |

(Continued)

FOREIGN PATENT DOCUMENTS

| | | |
|---|---|---|
| WO | 9641350 | 12/1996 |
| WO | 2008145190 | 12/2008 |

OTHER PUBLICATIONS

German Examination Report dated Jun. 15, 2022.

*Primary Examiner* — Rashad H Johnson
(74) *Attorney, Agent, or Firm* — Gerald E. Hespos; Michael J Porco

(57) ABSTRACT

A stator for an electrical machine has a stator core (16) with stator grooves (19). Stator windings (17) are received in the stator grooves (19) of the stator core (16). Groove insulators (20) are received in the stator grooves (19) of the stator core (16) such that the groove insulators (20) are arranged between the stator core (16) and the stator windings (17). The groove insulators (20) are made of plastic, namely a first plastic that provides the isolation function of the groove insulator (20) and a second plastic and/or a third plastic that provides a function of the respective groove insulator (20) differing from the isolating function.

13 Claims, 3 Drawing Sheets

(56) References Cited

U.S. PATENT DOCUMENTS

2022/0014062 A1\* 1/2022 Almeida E Silva ... H02K 9/227
2022/0021259 A1\* 1/2022 Almeida E Silva ..... H02K 9/19

\* cited by examiner

STATOR FOR AN ELECTRICAL MACHINE AND ELECTRICAL MACHINE

CROSS REFERENCE TO RELATED APPLICATION

This application claims priority on German Patent Application No 10 2021 115 932.6 filed Jun. 21, 2021, the entire disclosure of which is incorporated herein by reference.

BACKGROUND

Field of the Invention

The invention concerns a stator for an electrical machine and an electrical machine with a stator.

Related Art

The basic structure of an electrical machine is known from practice. More particularly, an electrical machine has a stator and a rotor. The stator comprises a housing, a stator core that may be configured as a stator sheet stack, and stator windings with end windings. The rotor comprises a rotor shaft and a rotor core that may be configured as a rotor sheet stack.

The stator core of the stator of an electrical machine has stator grooves that receive the stator windings and groove insulators. The groove insulators are arranged in the stator grooves between the stator core and the stator windings to electrically isolate the stator windings from the stator core.

U.S. Pat. No. 9,130,430 B2 discloses a stator of an electrical machine with a stator core and stator windings that are arranged in stator grooves of the stator core. Groove insulators also are shown. Electrical conductors are coated with an insulating material, namely a resin such as enamel. An insulating tube is arranged around the conductors that are coated with the insulating material. The insulating tube is made from a material with high dielectric strength.

US 2011/0095641 A1 also describes a stator of an electrical machine. The stator has stator grooves that receive stator windings and a groove lining in stator grooves receives the stator windings. The groove lining is extruded from a dielectric material to provide an integral lining.

U.S. Pat. No. 8,212,449 B2 discloses a further stator of an electrical machine.

US 2005/0012424A1 discloses a rotor of an electrical machine.

Known stators of electrical machines successfully use groove insulators between the stator windings and the stator core. However, there is a need for refining such electrical machines. In particular, there is a need for protecting groove insulators from damage. The groove insulators provide the electrical isolation function for the stator windings against the stator sheet stack, and enable the stator windings to be arranged in defined fashion inside the groove insulators.

An object of the invention is to create a novel stator of an electrical machine and an electrical machine with such a stator.

SUMMARY OF THE INVENTION

This disclosure relates to groove insulators made from at least first and second different plastics. The first plastic provides the electrical isolation function of the groove insulator. The second plastic and/or a third plastic provide at least function of the groove insulator differing from the electrical isolation function. Thus, the groove insulator comprises several plastics to meet several different requirements.

The first plastic of the groove insulator provides the electrical isolation function by electrically isolating the stator windings from the stator core.

The second plastic of the groove insulator of one embodiment provides a mechanical protection function for the first plastic, and the third plastic provides a holding function and/or a pretension function for the stator windings within the groove insulator.

At least one first portion of the first plastic, at least one second portion of the second plastic and/or at least one third portion of the third plastic may be co-extruded. Thus, a particularly thin groove insulator can be provided that meets all desired properties with a minimum installation space requirement.

In some embodiments, the at least one first portion of the first plastic is arranged between the stator windings and the at least one second portion of the second plastic. Alternatively, or additionally, the at least one third portion of the third plastic may be arranged between the stator windings and the at least one first portion of the first plastic. The plastic that is arranged between the stator windings and the at least one first portion of the first plastic also may be the second portion of a second plastic.

Exemplary embodiments of the invention are explained in more detail with reference to the drawing, without being restricted thereto.

DETAILED DESCRIPTION

Figure 1:
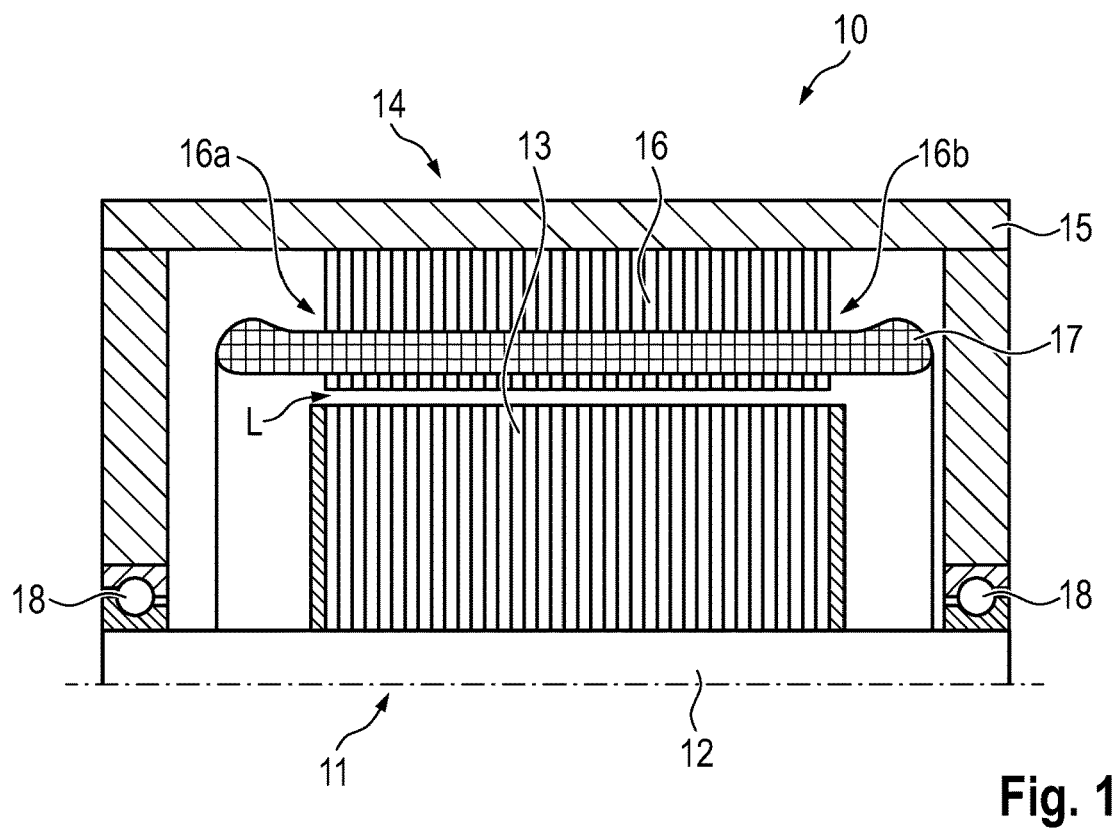
FIG. 1 is a cross-sectional view of an electrical machine.

FIG. 1 is a highly schematic cross-sectional view showing the basic structure of an electrical machine 10. The electrical machine 10 has a rotor 11 with a rotor shaft 12 and a rotor core 13 arranged on the rotor shaft 12. The rotor core 13 preferably is configured as a rotor sheet stack composed of cut sheets. The electrical machine 10 further has a stator 14 with a housing 15, a stator core 16 and stator windings 17 received by the stator core 16. The stator core 16 preferably is configured as a stator sheet stack composed of cut sheets. The rotor shaft 12 is mounted rotatably in the housing 15 via bearings 18.

Figure 2:
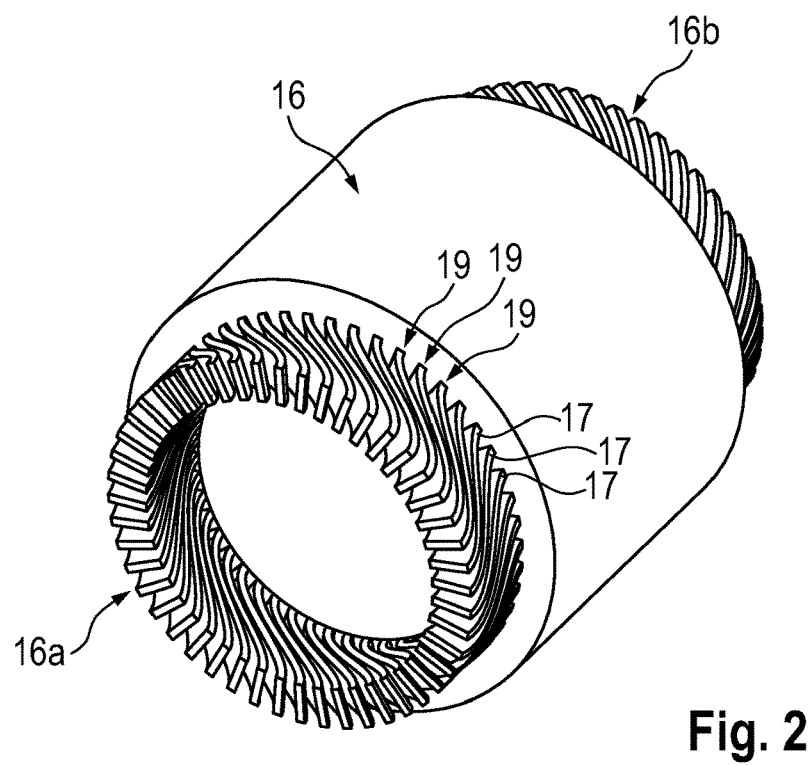
FIG. 2 is a perspective view of the stator of the electrical machine.

FIG. 2 shows a perspective arrangement of a stator core 16 together with stator windings 17 received by the stator core 16. As shown in FIGS. 1 and 2, the stator windings 17 protrude on both sides 16a, 16b of the stator core 16. The stator windings 17 are connected together at these portions of the stator windings 17 protruding relative to the stator core 16 to form so-called end windings.

The stator core 16 has stator grooves 19 that receive the stator windings 17.

The stator windings 17 received in the stator grooves 19 typically comprise several electrical conductors 17a. FIGS.

3, 4 and 5 show examples of a stator winding 17 received in a stator groove 19 of the stator core 16. Each of these stator windings 17 comprise six electrical conductors 17a. The number of six electrical conductors 17a per stator groove 19 is purely exemplary.

Groove insulators 20 also are arranged in the stator grooves 19 of the stator core 16, such that the groove insulators 20 are arranged between the stator core 16 and the stator windings 17. The groove insulators 20 provide an electrical isolation of the stator windings 17 against the stator core 16.

The groove insulators 20 of the stator 14 according to the invention consist of at least two different plastics and may be configured as integral or monolithic units.

A first plastic of the groove insulator 20 provides the electrical isolation function of the groove insulator 20 to electrically isolate the stator windings 17 against the stator core 16. The groove insulators 20 have at least one first portion 21 of the first plastic as well as a second plastic and/or a third plastic that provides a function of the respective groove insulator 20 differing from the electrical isolation function.

At least one second portion 22 is formed of the second plastic, and/or at least one third portion 23 is formed of the third plastic. If the groove insulator 20 has only the first portion 21 of the first plastic and the third portion 23 of the third plastic, the third plastic may be designated the second plastic and the third portion also the second portion.

Figure 3:
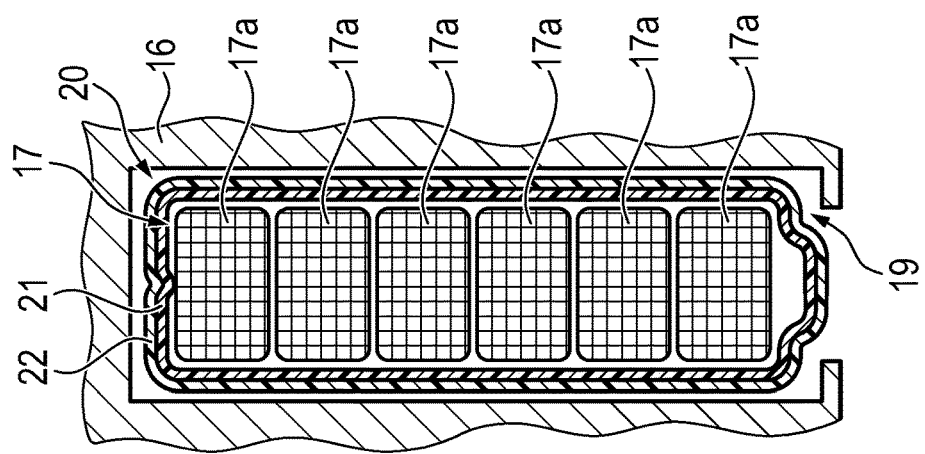
FIG. 3 is a first detail of the stator in the region of a stator groove.

In the embodiment of FIG. 3, the groove insulator 20 comprises a second portion 22 of the second plastic in addition to the first portion 21 of the first plastic. The first portion 21 of the first plastic again provides the electrical isolation function. The second portion 22 of the second plastic provides a mechanical protection function for the first portion 21. More particularly, the second portion 22 of the second plastic is arranged between the first portion 21 of the first plastic and the stator core 16. Accordingly, in FIG. 3, the first portion 21 of the first plastic is arranged between the second portion 22 of the second plastic and the stator windings 17. In FIG. 3, the second portion 22 of the second plastic surrounds the first portion 21 of the first plastic all around on the outside, so that the first portion 21 of the first plastic cannot contact the stator core 16. As a result, a mechanical protection function is provided for the first portion 21 of the first plastic. The second plastic may be harder than the first plastic. It is also possible that the second plastic is softer than the first plastic.

Suitable materials for the first plastic are in particular a PEEK plastic, a PSU plastic, a PPS plastic, a PEI plastic or a PPSU plastic. If, in FIG. 3, the second plastic of the second portion 22 is softer than the first plastic of the first portion 21, then an EPDM plastic preferably is used as the second plastic. If however, in FIG. 3, the second plastic of the second portion 22 is harder than the first plastic of the first portion 21, then a COC plastic is suitable as the second plastic.

Figure 4:
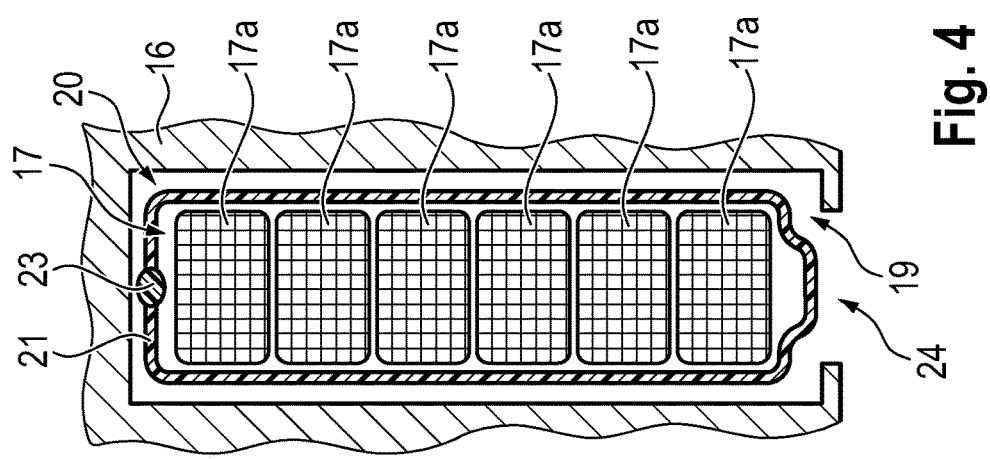
FIG. 4 is a second detail of the stator in the region of a stator groove.

In the embodiment of FIG. 4, a groove insulator 20 comprises a third portion 23 of the third plastic as well as the first portion 21 of the first plastic. This third portion 23 provides a holding function and/or a pretension function for the stator winding 17. More particularly, the third portion 23 in FIG. 4 exerts a pretension force on the conductors 17a of the stator winding 17 and presses the conductors 17a radially inward in the direction of a groove opening 24 of the respective stator groove 19.

A suitable plastic for the third portion 23 may be a spring-elastic plastic or a rubber-elastic plastic, and preferably a plastic that swells under the action of a fluid, such as a cooling fluid used for cooling the stator windings 17. For this, polyamide (PA) plastics are suitable.

Figure 5:
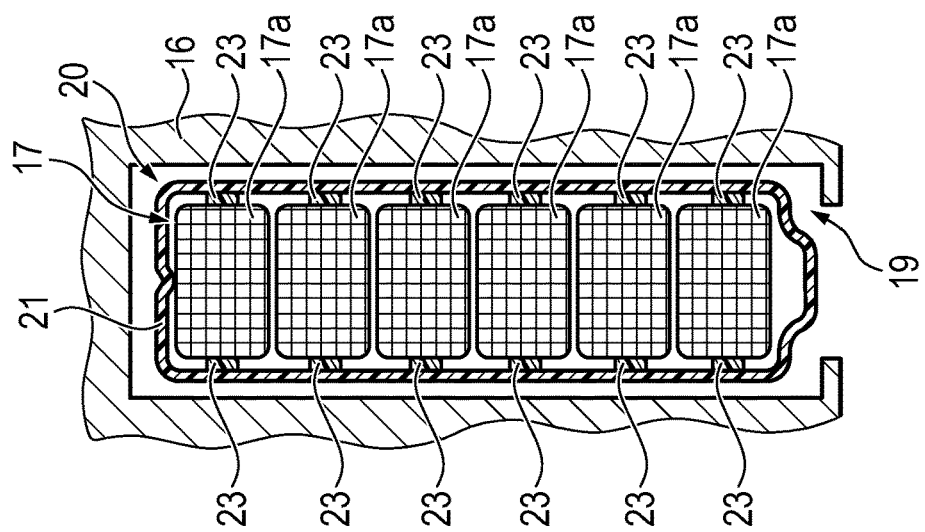
FIG. 5 is a third detail of the stator in the region of a stator groove.

The groove insulator 20 of FIG. 5 has the first portion 21 of the first plastic to provide the electrical isolation function and several third portions 23 that provide a holding function and/or a pretension function for the stator winding 17. In FIG. 4, the third portion 23 rests on one of the electrical conductors 17a of the stator winding 17 and presses the stator winding 17 inward. Several third portions 23 are shown in FIG. 5 and come to rest on side walls of the electrical conductors 17a to fix each of the electrical conductors 17a. The third plastic may swell under the action of a cooling fluid, and may be a PA plastic.

The embodiments of FIGS. 3, 4 and 5 may also be used in combination with one another. Thus, the second portion 22 of the second plastic from FIG. 3 may be used with the third portion 23 of FIG. 4 or the third portions 23 of FIG. 5.

The groove insulators 20 preferably are integral or monolithic.

Preferably, the first, second and/or third portions 21, 22 and/or 23 of the groove insulators 20 are formed together by co-extrusion so that accordingly, these portions 21, 22 and/or 23 are jointly co-extruded. In this way, a particularly thin-walled groove insulator 20 can be provided which has all desired functions but requires little installation space within the stator groove 19.

The invention further concerns an electrical machine 10 with a rotor 11 and a stator 14. The stator 14 is configured as described above, and comprises the above-described groove insulators 20. An air gap L is here formed between the rotor 11 and the stator 14. The stator 14 surrounds the rotor 11 radially on the outside.

Figure 6:
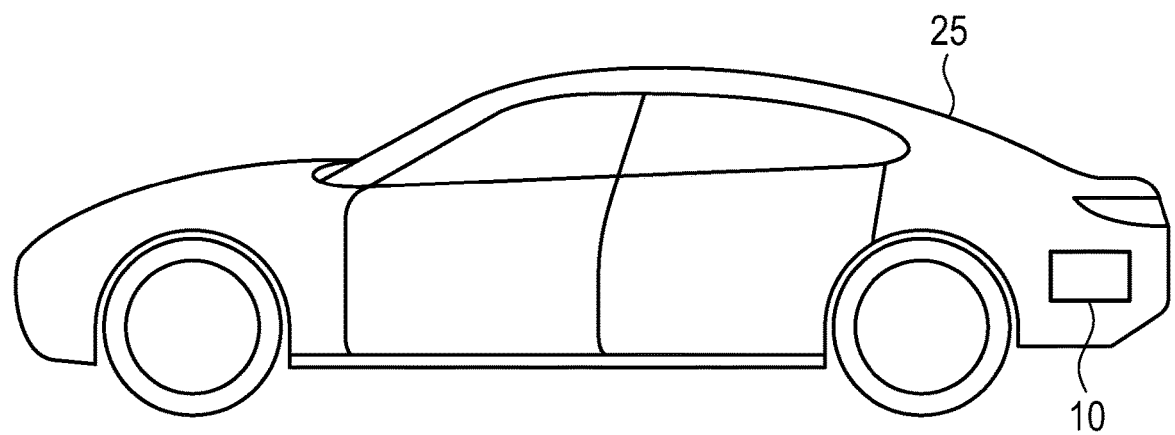
FIG. 6 is a motor vehicle with an electrical machine.

The electrical machine 10 may be an electrical machine 10 that is used as a drive device in a motor vehicle 25. FIG. 6 therefore shows a motor vehicle 25 with an electrical machine 10 that serves as a drive device in the motor vehicle 25. The motor vehicle 25 may be a hybrid vehicle or an electric vehicle.

What is claims is:

1. A stator (14) for an electrical machine, comprising:
a stator core (16) having stator grooves (19);
stator windings (17) received in the stator grooves (19) of the stator core (16); and
groove insulators (20) received in the stator grooves (19) of the stator core (16) such that the groove insulators (20) are arranged between the stator core (16) and the stator windings (17), wherein the groove insulators (20) are formed from at least first and second different plastics, the first plastic providing an electrical isolation function between the stator core (16) and the stator windings (17) in the respective stator groove (19), and the second plastic is a rubber-elastic or spring-elastic that is disposed between the first plastic and the stator windings and that provides a holding and spring tension force against the stator windings (17) in the respective stator grooves (19).

2. The stator of claim 1, wherein the groove insulators (20) further comprise at least one third plastic (22) that is different from the first and second plastics.

3. The stator of claim 2, wherein the at least one first portion (21) of the first plastic is arranged between the stator windings (17) and third plastic (22).

4. The stator of claim 3, wherein the third plastic (22) is selected from a plastic material that provides a mechanical protection function for the at least one first portion (21) of the first plastic.

5. The stator of claim 4, wherein the third plastic is harder than the first plastic.

6. The stator of claim 4, wherein the second plastic is softer than the first plastic.

7. The stator of claim 1, wherein each of the stator grooves (19) has two opposed side surfaces that face one another and each of the stator windings (17) has two opposite side surfaces that respectively face the opposed side surfaces of the respective stator groove (19), the second plastic comprises a plurality of spaced apart second plastic portions (23) arranged so that one of the second plastic portions is disposed on each of the side surfaces of each of the stator windings (17) and presses the respective stator winding (17) inwardly and away from the side surfaces of the respective stator groove (19).

8. The stator of claim 7, wherein the third plastic swells under the action of a fluid.

9. The stator of claim 2, wherein at least two of the first plastic, the second plastic and of the third plastic are co-extruded.

10. An electrical machine (19) with a rotor (11) and the stator (14) of claim 1 radially outwardly surrounding the rotor (11) with an air gap (L) between the rotor (11) and the stator (14).

11. The stator of claim 1, wherein the third plastic portions comprise a further third plastic portion disposed to urge the stator toward an open end of the groove.

12. A stator (14) for an electrical machine, comprising:
a stator core (16) having stator grooves (19), each of the stator grooves (19) having a stator opening (24), a closed end opposite the stator opening (24) and opposed side surfaces extending from the stator opening (24) to the closed end of the respective stator groove (19);
stator windings (17) received in the stator grooves (19) of the stator core (16); and
a plurality of elastic members (23) disposed on the stator windings (17) at spaced apart positions and disposed between the stator windings (17) and the side surfaces of the respective stator grooves (19), each of the plurality of elastic members (23) being formed from a rubber-elastic or spring-elastic plastic that swells under the action of a cooling fluid in the respective stator groove (19); and
an extruded member (20) formed at least partly from a plastic material (21) exhibiting an electrical isolation function, the extruded member (20) being disposed between the plurality of elastic members (23) and the side surfaces of the respective stator groove (19);
wherein the elastic members (23) resiliently press the stator windings (17) inward and away from the side surfaces of the respective stator groove (19).

13. The stator of claim 12, wherein the extruded member (20) is a coextruded member that comprises the plastic that exhibits the electrical isolation function and a plastic that is different from the plastic that exhibits the electrical isolation function.

* * * * *